D. E. SOMES.
Moistening, Cooling, and Warming Air.
No. 61,886.
5 Sheets—Sheet 1.
Patented Feb. 5, 1867.
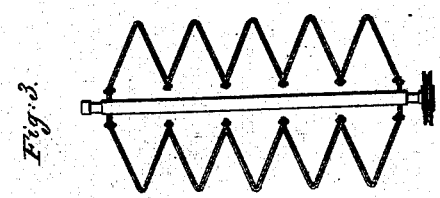
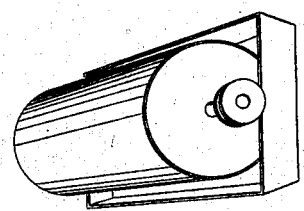
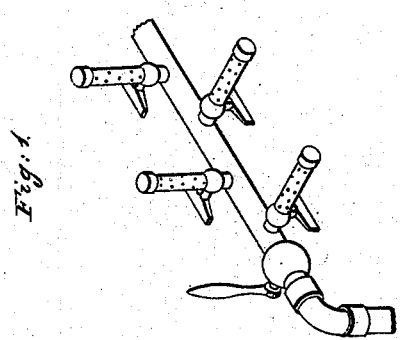

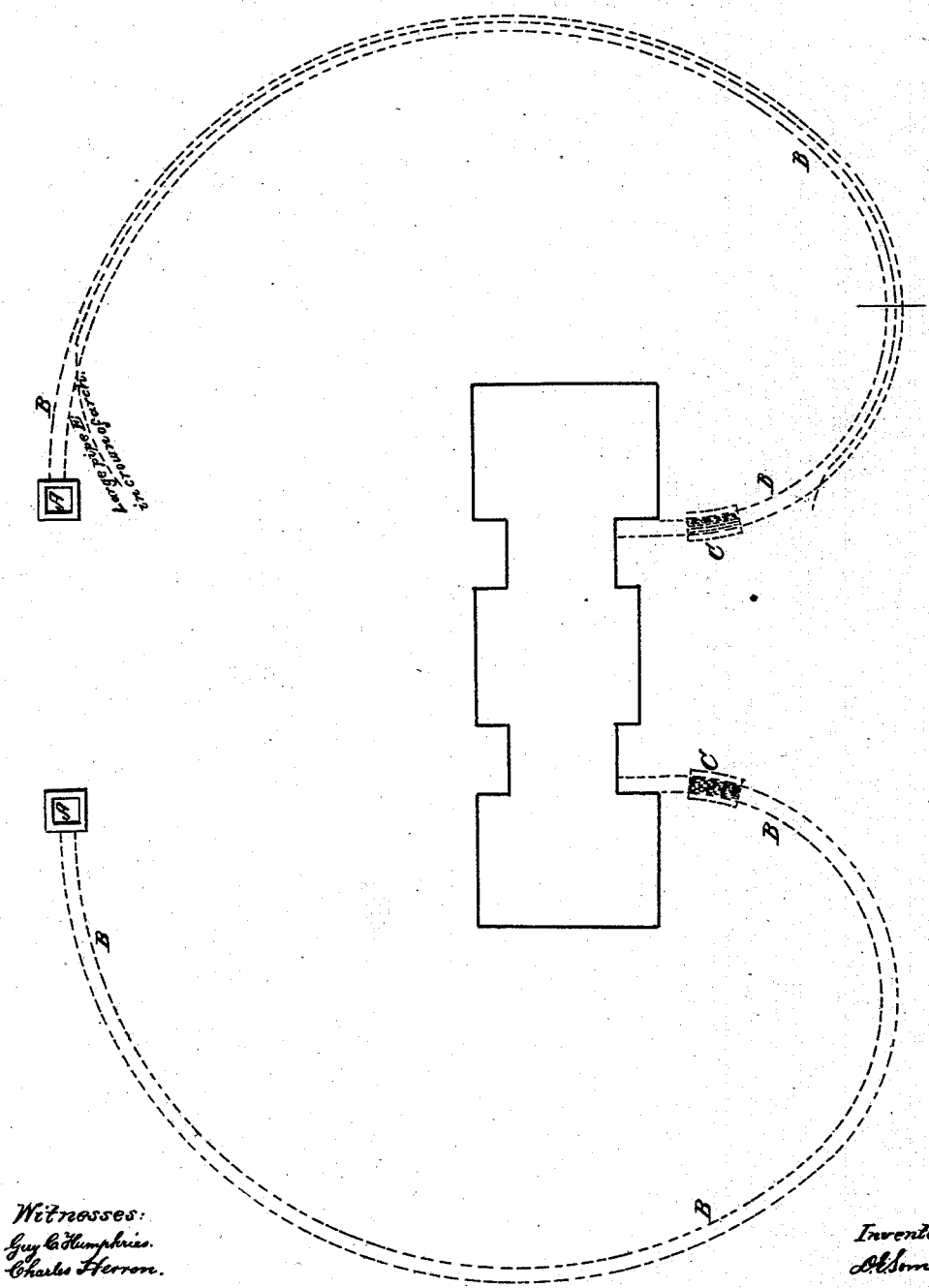

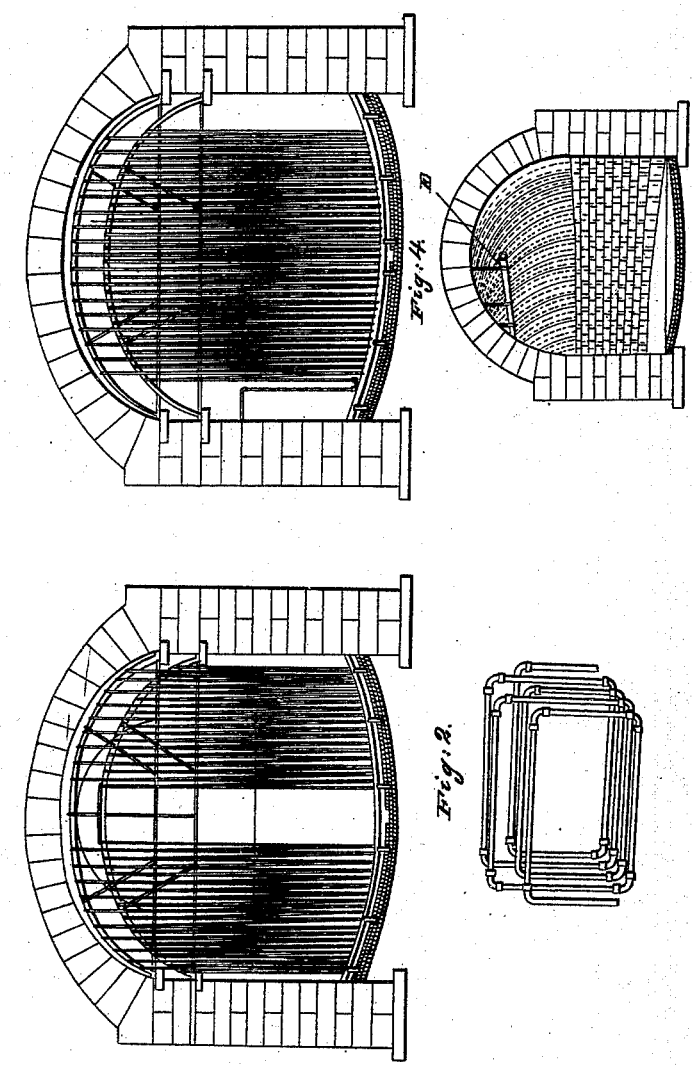

D. E. SOMES.
Moistening, Cooling, and Warming Air.
No. 61,886.
5 Sheets—Sheet 4.
Patented Feb. 5, 1867.
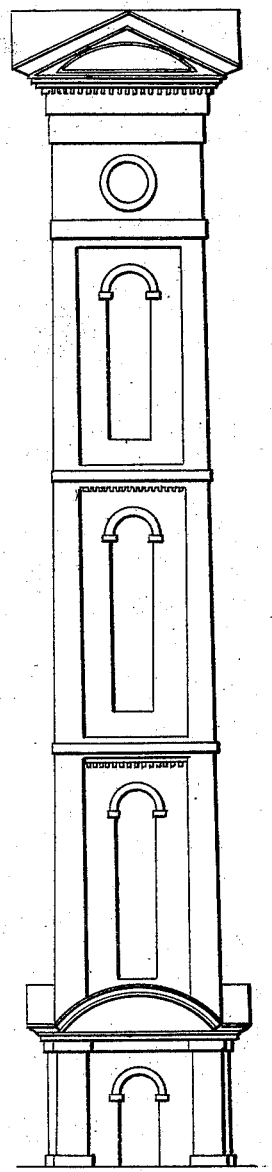
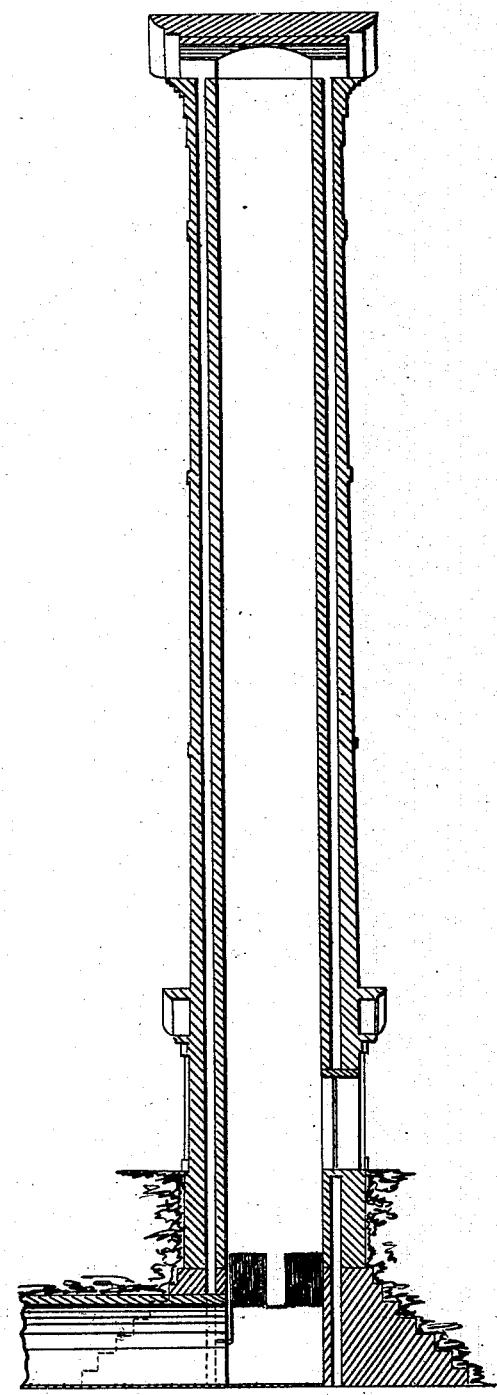

D. E. SOMES.
Moistening, Cooling, and Warming Air.
No. 61,886. 
5 Sheets—Sheet 5.
Patented Feb. 5, 1867.
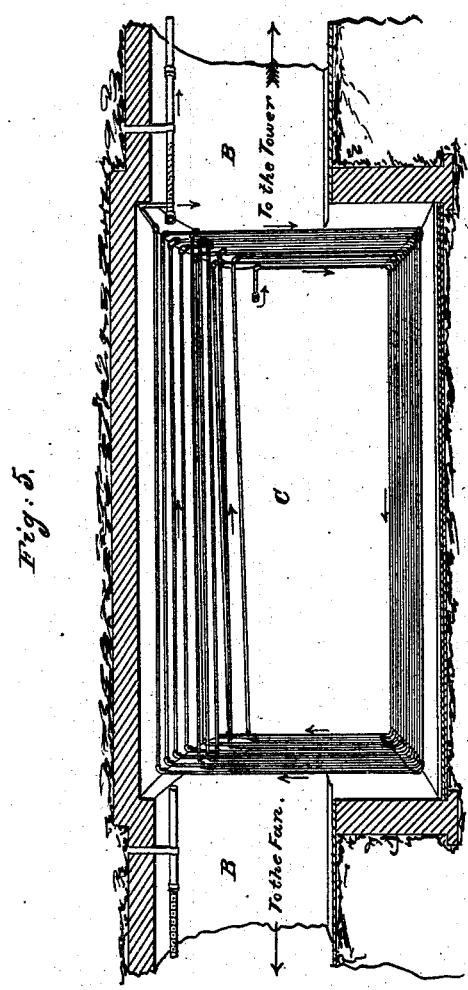

UNITED STATES PATENT OFFICE.

DANIEL E. SOMES, OF WASHINGTON, DISTRICT OF COLUMBIA.

IMPROVEMENT IN MOISTENING, COOLING, AND WARMING AIR.

Specification forming part of Letters Patent No. 61,886, dated February 5, 1867.

*To all whom it may concern:*

Be it known that I, DANIEL E. SOMES, of Washington city, in the county of Washington and District of Columbia, have invented a new and Improved Method of Moistening, Warming, and Cooling Air, and Ventilating, applicable to the United States Capitol and other large buildings; and I do hereby declare the following to be a full, clear, and exact description thereof, reference being had to the annexed drawing, making part of this specification.

Sheet No. 1 represents an outline ground plan of the Capitol and of the structures I have adopted in my method of supplying the building with pure and warm or cold air.

Sheet No. 2, Figures 1 and 3, exhibit cross-sections of the chamber C, Sheet 1, and different arrangements of the coils of heating or cooling pipes, the coils, as in Fig. 1, being arranged to allow passage through the center of the chamber, or, as in Fig. 3, to allow such passage on each side near the walls of the chamber. Fig. 2 is a sketch, showing partially the longitudinal arrangement of the pipes in the coil, which will be better understood by reference to Sheet 3. Fig. 4 is a cross-section of the air-duct B, (seen in dotted lines, Sheet 1,) and showing a water-pipe, E, suspended near the crown of the arch, the uses of which will hereinafter be described.

Sheet No. 3, Fig. 5, shows a longitudinal vertical section through the center of the chamber C, showing the manner of arranging the coils of pipes for cooling purposes.

Sheet No. 4 shows an elevation and section of one of the towers A. (Seen in plan, Sheet 1.)

Sheet No. 5 shows devices for moistening the air that has been heated for warming purposes, and which will be more particularly referred to hereinafter.

The object of my invention is to secure a thorough ventilation to the Capitol, by supplying a copious flow of pure and cold air during summer, and pure, warm, and sufficiently-moistened air during the winter.

In my system the temperature of the air to be supplied is reduced as low as that of the earth would be at a depth below the surface where the influence of the sun's rays is inappreciable. This depth varies in different localities; but the variation is due only to existing local causes, such, for instance, as the presence of a very cold or warm spring of water.

It is known from observations made in deep cellars, wine and ale vaults, and other excavations, that a depth of from twenty to forty feet below the surface would be sufficient to insure a temperature of from 45° to 50° Fahrenheit during the hottest days in summer.

A A, Sheet 1, are two towers, about twenty-five feet square, placed at some distance—say, two hundred yards, or thereabout—from the building to be ventilated, and sufficiently far apart to be symmetrical with their altitudes, which should be great enough to permit their tops to be above impurities and to be in a stratum of cool air. This height I have assumed to be about one hundred and seventy (170) feet. These towers are the supply-pipes to the ventilating apparatus, and are constructed with hollow walls, so as to have a non-conducting air-space between their inner and outer surfaces, in order that the sun's rays shall have no power to heat the air on its downward passage.

The air-space in the thickness of the walls still further tends to operate as a cooler on the inside walls by the action of evaporation going on within it from the bottom, where it is closed, and naturally damp, to the top, where it is open to the atmosphere.

The wells or inner chambers of the towers are open to a free ingress of air at top, and extend down below the surface of the ground to a distance of about thirty feet, where they each communicate with an air-duct, B, (seen in dotted lines, Sheet 1, and in section, Sheet 4,) extending horizontally from the bases of the towers, in as great a circuit as may be desired, to the chambers of the ventilating-fans in the building. The floors of the ducts will be on a level with the bottoms of the tower-shafts, and they will have a height and width of, say, twelve feet, and be covered with a semicircular arch, resting upon walls of a proper thickness. At the ends of the ducts nearest the fan-rooms in the building they will be enlarged into chambers C. (See sheets 1, 2, and 3.) The bottoms of these chambers are twelve or fifteen feet lower than the floors of the ducts, while their tops are on about the same line as those of the ducts, and they are about forty feet in length by, say, twenty in width. Other chambers, similarly constructed, may be made in other parts of the ducts should they be required, though they are not deemed necessary. The use of these chambers is to receive coils of water-pipes, so arranged that they, passing through the masonry into the chamber at that end of it which is farthest from the fan, shall be carried directly down to the bottom of the chamber, thence along the whole length of the bottom toward the fan, through a medium of extreme coolness. Having reached the end of the chamber nearest the fan, it will rise to the crown of the chamber, or near it, and be returned, so as to descend again to the bottom of the chamber in the same vertical transverse plane as the first descent, and be carried again along the bottom, to rise and be returned as before; and the coils necessary for such a flow of water are continued and repeated until as much cooling-surface of water-pipe is obtained as room will permit, leaving space for passage either through the middle or at the sides. (See Sheets 2 and 3.)

The cooling medium in the bottom of the chamber through which the pipes pass may be a reservoir or spring of water whose coolness is due to its natural depth below the surface, or a packing of ice, which would last, under such conditions, for a long time.

That portion of the coil which is vertical at each end of the chamber is composed of different lengths of pipe, placed alternately, so as to make two rows of different altitudes extending along the upper part of the chamber C, for the purpose of having the pipes in which the cool water flows distributed as much as possible among the air flowing through the duct and chamber to the fan. To this end, therefore, three or more rows of horizontal pipes may be built in the top of the coil, the vertical pipes being in lengths to suit. It will be seen, moreover, that the coil is so arranged that the water, cooled in its passage along the bottom of the chamber, shall rise in those vertical pipes that are nearest to the fan, and descend in the pipes at the opposite end of the chamber. This is in order that the air may have as little space as possible to traverse to reach the fan after being in contact with the coldest pipes. What little elevation of temperature the water may receive in its passage along the top pipes of the coil will be reduced again as it flows along the bottom through the cooling medium. The arrows on Sheet 3 indicate the direction of the flow of water through the coil. After the water has passed through the coil, it may be either made to flow through the other coils or pass directly to purposes of ornament or use.

If deemed expedient, a coil of cooling-pipe may be introduced into the fan-chamber to act on the air in its passage from the fan to the rooms where it is required, though it is not contemplated that such an arrangement will be at all necessary.

A pipe, E, Fig. 4, Sheet 2, larger in diameter than the pipes composing the coil, extends along the duct near its crown, through which water flows toward the tower. This pipe is perforated at intervals along its length with minute holes, through which the water jets in fine spray, still further conducing to a low temperature of air in the duct. Near the tower the pipe is carried through the masonry, and the water is conveyed away for useful or ornamental purposes; or it may be returned to pass into the coil of smaller pipes, which are located in the chamber C, before being thus used.

The fan may be dispensed with if a system of water-pipes be placed within the towers. The air, being cooled by said pipes, becomes condensed, and consequently heavier. It falls and forces its way through the ducts into the halls, to be cooled where the air is warm and light.

If the outward-draft flue or eduction-passage for the warmer air be connected with a chimney or heated flue, or be in close proximity thereto, the amount of cooled air flowing in from the ducts will be increased. In cold weather the pipes of the coil, instead of being charged with cold water, are converted into steam-pipes for the purpose of heating the air supplied by the ducts B. The temperature of the earth below raises the temperature of the air to about 50°. A very small amount of steam, therefore, is required to bring it up to the requisite point—say 68°. Steam may be also used, as is now done, in the passage from the fan to the room. The waste-steam may be, moreover, used to keep up the temperature to the proper degree, and counterbalance the loss by radiation through the walls of the air-channel, as well as to aid in preventing the air from becoming too dry, the amount of moisture supplied to the hot air being regulated as hereinafter set forth. The air is moistened by the use of pipes introduced either into the subterranean air-ducts or into the chambers above the fan, which pipes have short and minutely-perforated branches, through which the steam may jet. Fig. 1, Sheet 5, shows a portion of such pipe with some branches connected with the main pipe by stop-cocks. As the air passes along over among the pipes it absorbs the vapor and becomes moistened thereby.

When steam would not be available for use in moistening the heated air, a vat of water is placed in the duct, over which the air must pass on its way to or from the fan, and a revolving drum or cylinder, deriving its motion from the same power as the fan, covered with cloth, felt, sponge, or other suitable material, is placed in the vat, so that as it revolves there shall be constantly presented a wet surface to the current of heated air as it flows. (See Fig. 2, Sheet 5.)

In Fig. 3, same sheet, is shown, in section, a modification of the revolving drum or cylinder, the peculiar construction of which affords a much greater surface for moistening the air than is obtained in a plain cylinder like Fig. 2. Spray jets of warm water may be thrown through the air in the duct, which, as it passes, will collect moisture therefrom.

A smooth metallic or glass or glazed earthen vessel, supplied from a water-cooler, or from the system of cold-water pipes hereinbefore described, or by any other effective mode, and placed within said room, will denote the amount of moisture contained in the air by the "sweat" or condensed vapor accumulated on the surface of the said vessel.

The temperature of the vessels should be noted in order that the regulation may be satisfactory; or the usual instruments for determining the hygrometric condition of the air, such as wet-bulb thermometers, may be employed.

The roofs of the House and Senate chamber being of single glass, the rays of the sun necessarily produce intense heat in those halls during the hottest days in summer, while in winter cold is admitted, varying with the temperature of the atmosphere without. To prevent this evil in a great degree, I propose to have a series of glass roofs or ceilings, one above the other, separated by only a few inches, so as to leave non-conducting air-spaces between them. These air-chambers should be tight enough to prevent a circulation or change of air within them. A few inches above the upper glass roof a transparent cover or roof, made of cloth or other suitable material, and painted white, may be placed to mitigate the heat of the sun's rays. A free circulation of air between the glass and said covering should be allowed. Of course, this covering should be firmly held in place against destruction or injury from heavy winds and storms. This may be done by constructing a frame similar to window-sash; and after placing and stretching the cloth upon it, strong strips should be screwed or otherwise fastened upon the frame, so that the cloth shall be held between them in panels or squares. As air is a non-conductor and glass a poor one, the object of excluding heat and cold, while light is admitted, will be accomplished by the adoption of this or a substantially equivalent device.

Having thus fully described my invention, what I claim therein as new, and desire to secure by Letters Patent, is—

1. Securing and regulating a high or low temperature of air, substantially as and for the purpose described.

2. Moistening and purifying the air, substantially as set forth.

3. The combination of the devices herein described for moistening with the devices for cooling and warming air.

4. The series of skylights constructed with air-spaces between them, substantially as and for the purpose set forth.

5. The false roof above the skylights, substantially as described, in combination with the series of skylights, as and for the purpose set forth.

D. E. SOMES.

Witnesses:
 E. L. NORFOLK,
 CHARLES HERRON.